US009949273B2

United States Patent
Dahlman et al.

(10) Patent No.: US 9,949,273 B2
(45) Date of Patent: Apr. 17, 2018

(54) FORWARDING HARQ FEEDBACK CONSIDERING LATENCY OVER AVAILABLE CHANNELS

(75) Inventors: Erik Dahlman, Stockholm (SE); David Astely, Bromma (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/412,142

(22) PCT Filed: Jul. 4, 2012

(86) PCT No.: PCT/SE2012/050773
§ 371 (c)(1),
(2), (4) Date: Dec. 30, 2014

(87) PCT Pub. No.: WO2014/007695
PCT Pub. Date: Jan. 9, 2014

(65) Prior Publication Data
US 2015/0156781 A1   Jun. 4, 2015

(51) Int. Cl.
*H04W 4/00* (2009.01)
*H04W 72/08* (2009.01)
(Continued)

(52) U.S. Cl.
CPC .......... *H04W 72/08* (2013.01); *H04L 47/2466* (2013.01); *H04W 40/12* (2013.01); *H04W 72/0406* (2013.01)

(58) Field of Classification Search
CPC ........................... H04W 72/08; H04W 72/0406
(Continued)

(56) References Cited

U.S. PATENT DOCUMENTS

2010/0097965 A1* 4/2010 Kwon ................. H04L 5/14
370/294
2011/0053585 A1* 3/2011 Otonari ............... H04W 72/085
455/422.1
(Continued)

FOREIGN PATENT DOCUMENTS

CN          101292532 A      10/2008
EP          2 299 754 A1      3/2011
(Continued)

OTHER PUBLICATIONS

Supplementary European Search Report issued in corresponding application EP 12880653.6 dated Jan. 19, 2016, 4 pages.
(Continued)

*Primary Examiner* — Ricky Ngo
*Assistant Examiner* — Wei-Po Kao
(74) *Attorney, Agent, or Firm* — Rothwell, Figg, Ernst & Manbeck, p.c.

(57) ABSTRACT

It is presented a method performed in a first network node. The method comprises the steps of: receiving an uplink transmission from a mobile communication terminal; determining, based on content of the uplink transmission, information to be transmitted over a first communication channel when the content comprises control data intended for a second network node; transmitting the information over the first communication channel to the second network node when the information is to be transmitted over the first communication channel; and transmitting the information via a second communication channel, the second communication channel being physically separate from the first communication channel, when the information is not to be transmitted over the first communication channel. A corresponding network node is also presented.

16 Claims, 3 Drawing Sheets

(51) Int. Cl.
*H04W 40/12* (2009.01)
*H04W 72/04* (2009.01)
*H04L 12/855* (2013.01)

(58) Field of Classification Search
USPC .................................. 370/216–228, 310–350
See application file for complete search history.

(56) References Cited

U.S. PATENT DOCUMENTS

| | | |
|---|---|---|
| 2011/0249619 A1 | 10/2011 | Yu et al. |
| 2011/0249620 A1 | 10/2011 | Yu et al. |
| 2013/0120134 A1* | 5/2013 | Hicks, III ............ G08B 25/004 340/501 |
| 2013/0201966 A1* | 8/2013 | Weng .................... H04W 72/04 370/336 |
| 2015/0009923 A1* | 1/2015 | Lei .................... H04W 72/0413 370/329 |

FOREIGN PATENT DOCUMENTS

| | | |
|---|---|---|
| EP | 2291053 A1 | 3/2011 |
| EP | 2 403 290 A1 | 1/2012 |
| WO | 2007/045972 A2 | 4/2007 |
| WO | 2011/110229 A1 | 9/2011 |
| WO | 2013020200 A1 | 2/2013 |

OTHER PUBLICATIONS

Chinese Search Report issued in Application No. 2012800744523 dated Aug. 18, 2017, 2 pages.

* cited by examiner

FORWARDING HARQ FEEDBACK CONSIDERING LATENCY OVER AVAILABLE CHANNELS

CROSS REFERENCE TO RELATED APPLICATION(S)

This application is a 35 U.S.C. § 371 National Phase Entry Application from PCT/SE2012/050773 Jul. 4, 2012, the disclosure of which is incorporated by reference.

TECHNICAL FIELD

The invention relates to a method and network node for receiving an uplink transmission and transmitting the information based on content of the uplink transmission further.

BACKGROUND

A mobile communication system comprises a number of network nodes, such as radio base stations, providing connectivity to mobile communication terminals.

Uplink data is transmitted from the mobile communication terminal and is received by the network node. The network node then either acts on the data, when it is control data related to the network node, or routes the content of the received uplink transmission further up in the mobile communication system.

In order to reduce problems and improve performance in the mobile communication system, the way uplink data is routed can be improved even further.

SUMMARY

When uplink data is received at a first network node, it may contain control data which should be sent to a second network node. This can be the case when there are different network nodes managing uplink and downlink, respectively, with the mobile communication terminal. While the prior art does provide routes to send control data from the first network node, these routes often involve multiple intermediate nodes and introduce a latency which can make the control data outdated by the time it arrives at the second network node. It would thus be beneficial if there was a way to better route uplink data received at a network node.

According to a first aspect, it is presented a method performed in a first network node. The method comprises the steps of: receiving an uplink transmission from a mobile communication terminal; determining, based on content of the uplink transmission, information to be transmitted over a first communication channel when the information comprises control data intended for a second network node; transmitting the information over the first communication channel to the second network node when the information is to be transmitted over the first communication channel; and transmitting the information via a second communication channel, the second communication channel being physically separate from the first communication channel, when the information is not to be transmitted over the first communication channel. The separation and establishment of two physically separate communication channels provides a way to route control data via the first communication channel and other data, such as user data via the second communication channel. This makes it possible to implement the first communication channel so that it provides low latency and still with relatively low capacity, since the first channel does not need to be able to carry all data received at the first network node which is bound for the second network node. It is to be noted that the uplink transmission received by the network node relates to how the uplink transmission is received, not to how the uplink transmission is sent. In other words, any corruption or other transformation of the uplink transmission occurring over the wireless interface is part of the uplink transmission when it is received by the network node.

For transmissions from the first network node to the second network node, latency via the first communication channel may be lower than latency via the second communication channel. In other words, control data intended for the second network node is sent over the first communication channel to ensure that the second network node receives the control data quickly.

The latency may be an average latency or a maximum latency. Latency from the first network node to the second network node is here to be interpreted as the time it takes for the first unit of a set of data to be transferred from the first network node to the second network node.

The step of determining information to be transmitted over the first communication channel may comprise determining information to be transmitted over the first communication channel when the control data is associated with a future downlink transmission from the second network node to the mobile communication terminal which needs to occur within a limited time period. Such control data is time critical and would benefit from being forwarded to the second node with low latency.

The step of determining the information to be transmitted over the first communication channel may comprise determining that the control data is of a control data type selected from the group consisting of acknowledgement for hybrid automatic repeat request, retransmission control data for Radio Link Control, and downlink channel status report. These control data types are also time critical and would benefit from being sent over a channel with low latency if possible.

In the step of transmitting the information over the second communication channel, the second communication channel may comprise the use of one or more communication bearers selected from the group consisting of: a microwave link, an optical fibre, and a copper connection. These are high capacity links which are appropriate for the second communication channel.

In the step of transmitting the information over the first communication channel, the first communication channel may comply with Global System for Mobile communication, GSM. GSM is a relatively low capacity (which is not a main problem for the control data) but also requires a relatively small frequency band. Moreover, the latency of a direct GSM connection can be made low, which suits the first communication channel.

In the step of transmitting the information over the first communication channel, the first communication channel may comply with LTE and the first communication channel may be on a different frequency band than a frequency band used for communications with the mobile communication terminal. Since LTE may already be implemented in the first and second network nodes, using LTE can be a convenient and efficient choice to implement the first communication channel.

According to a second aspect, it is presented a network node comprising: a processor; and an instruction memory storing instructions. The memory instructions may, when executed, cause the network node to: receive uplink data from a mobile communication terminal; determine, based on content of the uplink transmission, information to be transmitted over a first communication channel when the information comprises control data intended for a second network node; transmit the information over the first communication channel to the second network node when the information is to be transmitted over the first communication channel; and transmit the information via a second communication channel, the second communication channel being physically separate from the first communication channel, when the information is not to be transmitted over the first communication channel.

For transmissions from the first network node to the second network node, latency via the first communication channel may be lower than latency via the second communication channel.

The latency may be an average latency or a maximum latency.

The instructions to determine information to be transmitted over the first communication channel may comprise determining the information to be transmitted over the first communication channel when the control data is associated with a future downlink transmission from the second network node to the mobile communication terminal which needs to occur within a limited time period.

The instructions to determine information to be transmitted over the first communication channel may comprise instructions to determine that the uplink data is of a control data type selected from the group consisting of acknowledgement for hybrid automatic repeat request, retransmission control data for Radio Link Control, and downlink channel status report.

The second communication channel may be arranged to use of one or more communication bearers selected from the group consisting of: a microwave link, an optical fibre, and a copper connection.

The first communication channel may comply with Global System for Mobile communication, GSM.

The first communication channel complies with LTE and the first communication channel may be arranged to use a different frequency band than a frequency band intended to be used for communications with the mobile communication terminal.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
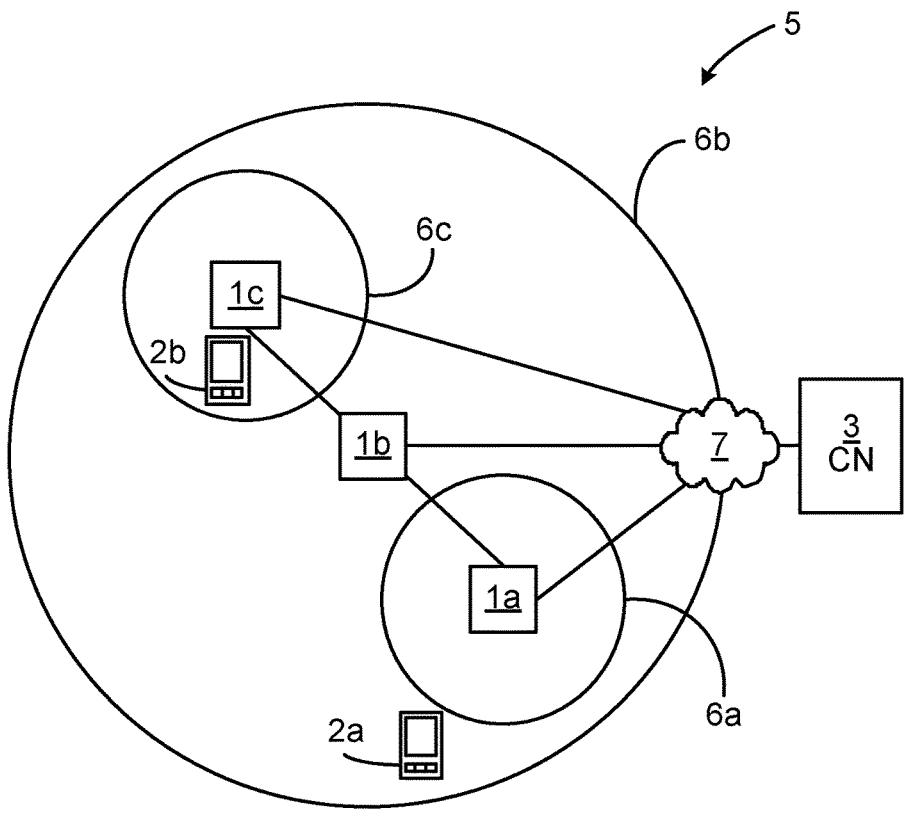
FIG. 1 is a schematic diagram illustrating a mobile communication network where embodiments presented herein can be applied.

FIG. 1 is a schematic diagram illustrating a mobile communication network 5 where embodiments presented herein can be applied. The mobile communications network 5 comprises a core network 3 and one or more network nodes 1a-c, here in the form of radio base stations such as evolved Node Bs 1, also known as eNode Bs or eNBs. The network nodes 1a-c could also be in the form of Node Bs, BTSs (Base Transceiver Stations) and/or BSSs (Base Station Subsystems) or remote radio units. The network nodes 1a-c provide radio connectivity to a plurality of mobile communication terminals 2a-b. The term mobile communication terminal is also known as user equipment, mobile terminal, user terminal, user agent, etc.

The mobile communication network 5 can e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), etc. or any future mobile communication standard, as long as the embodiments described hereinafter are applicable.

The communication between each one of the mobile communication terminals 2a-b and the network nodes 1a-c occurs over a wireless radio interface complying with a standard of the mobile communication network 5.

Each network node 1a-c provides downlink coverage using a corresponding cell 6a-c. In this example, the downlink coverage areas of the three cells 6a-c overlap to the extent that the first and third cells 6a, 6c of the first and third network nodes 1a, 1c are contained in the second cell 6b. For example, the second cell 6b can be a macrocell and the first and third cells 6a, 6c can be picocells (or nanocells, femtocells, or a combination of these, etc.). The uplink coverage may differ from the downlink coverage and depends on many factors, such as transmission power of the mobile communication terminals, location of the network nodes, physical topology of between the mobile communication terminal and network nodes, etc.

In this embodiment, both the first and third cells 6a, c are completely contained within the second cell 6b. Optionally, one or more of the smaller cells 6a, c can be partly contained (not shown) in the second cell 6b or even without any overlap, as long as they use the same cell identifier.

The first mobile communication terminal 2a is only within the downlink coverage area of the second cell 6b, while the second mobile communication terminal 2b is within the downlink coverage areas of the third cell 6c and the second cell 6b.

The network nodes 1a-c are connected via a routing network 7 to a core network 3 for connectivity to central functions and other networks. The routing network 7 routes data to an appropriate receiving node.

Figure 2:
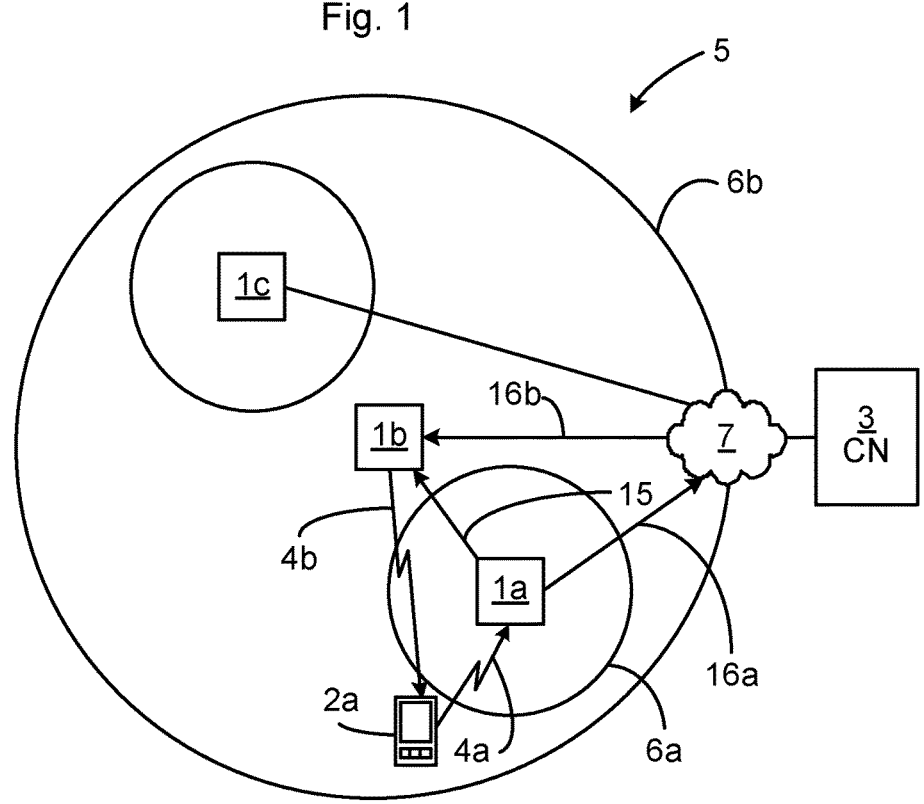
FIG. 2 is a schematic diagram illustrating the mobile communication network of FIG. 1, further illustrating communication paths.

FIG. 2 is a schematic diagram illustrating the mobile communication network 5 of FIG. 1, further illustrating communication paths in one example. The mobile communication network 5 of FIG. 2 is equivalent to the mobile communication network of FIG. 1, but here only the first mobile communication terminal 2*a* is shown, along with the uplink and downlink communication to the first mobile communication terminal 2*a*.

In this example, the first mobile communication terminal 2*a* receives downlink transmissions from the second network node 1*b*, e.g. because it can receive the second network node with higher power, compared to the first network node 1*a*. Nevertheless the first network node 1*a* is much closer to the first mobile communication terminal 2*a*. Hence, in some situations, it will be the first network node 1*a* that receives the uplink transmission over a first wireless radio interface 4*a* while the downlink transmission is transmitted from the second network node 1*b* over a second wireless radio interface 4*b*.

There could be other reasons for the first communication terminal receiving downlink communication from one network node and providing uplink to another network node, such as any other situation where the transmit power is higher in one network node than another, varying radio conditions, etc. In one example, a network node could be used only for uplink traffic, whereby downlink traffic must be handled from another network node.

The first network node is arranged such that it can forward uplink information related to content received on the first wireless radio interface 4*a*, or information generated from signals received on the first wireless radio interface 4*a*, via a first communication channel 15 or a second communication channel 16*a*.

The second communication channel 16*a* is a conventional communication channel separate from the first communication channel 15, and is connected to the routing network 7 for routing either to the core network 3 or another network node 1*b-c*, such as via a third communication channel 16*b* to the second network node 16*b*. All uplink user data received by the first network node 1*a* on the wireless link 4*a* is routed via the second communication channel 16*a*.

The first communication channel 15 connects the first network node 1*a*, directly or via other nodes, to the second network node 1*b*. The first communication channel 15 has a lower latency for sending data from the first network node 1*a* to the second network node 1*b* than via the second communication channel 16*a*. This allows uplink time critical control data received by the first network node 16*a* to be forwarded to the second network node 1*b*. The latency mentioned here can be calculated as an average latency or a maximum latency.

In one embodiment, such time critical control data is associated with future downlink transmissions from the second network node, which needs to occur within a limited time period.

A first example of such time critical control data is Ack (positive acknowledgement)/Nack (negative acknowledgement) signalling of a HARQ (Hybrid Automatic Repeat Request) protocol related to downlink transmissions. This signalling allows the second network node 1*b* to, when a Nack is received, retransmit within a given time limit. When an Ack is received, the second network node 1*b* can proceed with further transmissions. It is clear that in order to have low or minimal impact on the user experience, the delivery of to the second network node 1*b*, which performs downlink communication, the Acks and Nacks are time critical.

A second example of such time critical control data is information about the result of the decoding of uplink transmissions received at the first network node 1*a*. Such information may be needed by the second network node 1*b* in order for the second network node 1*b* to be able to generate Ack/Nack signalling related to a HARQ protocol for the uplink transmission. The Ack/Nack signalling is transmitted on the downlink from the second network node 1*b*, since the mobile terminal is only within the downlink coverage of the second cell 1*b*. The mobile communication terminal expects to receive downlink Ack or Nack from the network side within a limited time after the reception of the corresponding uplink data transmission. This is needed for the mobile communication terminal to be able to retransmit the data with low latency to minimise any negative user experience.

A third example of such time critical control data is channel quality information (CQI) received on the uplink by the first network node 1*a*. This CQI needs to be forwarded to the second network node 1*b* for scheduling decisions for downlink transmissions.

A fourth example of such time critical control data is RLC (Radio Link Control) control data for retransmission protocols in HSPA (High Speed Packet Access) and LTE.

It is to be noted that the two network nodes in communication over the first communication channel 15 do not need to be from a pico node to a macro node. There are other situations where low-latency control signalling is needed e.g. between two pico nodes or between two macro nodes. Also, the control signalling on the first communication channel 15 does not necessarily need to go only in the pico-to-macro direction. There are situations where there is need for low-latency control signalling going in the opposite (macro-to-pico) direction. One example is when scheduling decisions for downlink pico transmissions are made at the macro node, e.g. because the scheduling of pico-node transmissions is to be coordinated between multiple pico nodes. Such scheduling decisions must then be communicated to the pico node with low latency in order for the pico node to be able to carry out the downlink transmission within a certain time.

The first communication channel 15 can be implemented using any suitable technology, as long as the latency between the two connected nodes is sufficiently low. In particular, the first communication channel 15 can be a wireless link or a wired link. When line-of-sight can not be ensured, any wireless communication can be within frequency bands typically used for cellular communication, such as below 3 GHz. However, when line-of-sight can be ensured, higher frequency communication can also be used.

Optionally, communication over the first communication channel occurs via one or more intermediary nodes, as long as the requirements on latency are met.

For duplex operation over the first communication channel 15, it could be based on frequency-division duplex (FDD), i.e. different frequencies for the two transmission directions, or time-division duplex (TDD), i.e. the same frequency for the two transmission directions but different time periods are used for the two directions.

In one embodiment, the first communication channel is implemented using GSM. The control signalling requires relatively low data rates whereby using GSM is sufficient. Moreover GSM has the advantage of requiring a relatively low amount of frequency bandwidth, e.g. compared to LTE.

In one embodiment, the first communication channel 15 is implemented using LTE. The frequency band used for the first communication channel 15 can then differ from the frequency band used for communication with the mobile communication terminals 2a-b, to prevent interference. Optionally, the same frequency band is used for a consistent implementation, e.g. due to what frequency bands have been licensed.

The second communication channel can use one or more of the following communication bearers: a microwave link, an optical fibre, and a copper connection.

Figure 3:
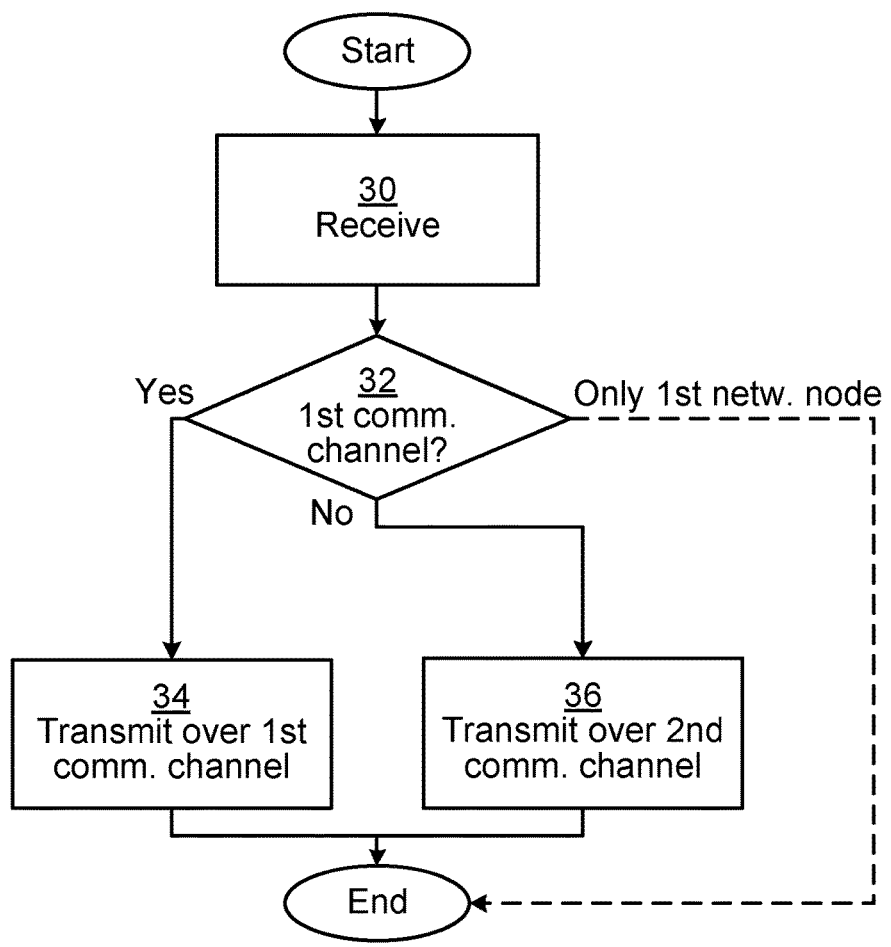
FIG. 3 is a flow chart illustrating a method according to one embodiment performed in one of the network nodes of FIGS. 1-2.

FIG. 3 is a flow chart illustrating a method according to one embodiment. This method is mentioned to be performed in a first network node, but this is to be interpreted as any one of the network nodes of FIG. 2, as long as it is a network node that receives uplink data from a mobile communication terminal. Moreover, the second network node mentioned in the method is to be interpreted as any network node, other than the network node performing the method. The method relates to uplink transmission routing, using either the first or the second communication channel as described above.

In a receive step 30, an uplink transmission is received from a mobile communication terminal.

In a conditional first communication channel step 32, the network node determines what communication channel to use for information based on the content of the uplink transmission. The information may be the content itself, e.g. when the content is control data that is bound for the second network node. At other times, the information can relate to decoding of the content performed in the first network node, e.g. an Ack or Nack, but needs to be transmitted from the second network node since the second network node is responsible for downlink communication. In particular, when the information comprises control data intended for a second network node, the first network node determines to use the first communication channel. Optionally, if the information relates to control data for the first network node, the method ends.

The method thus continues to a transmit over first communication channel step 34 if it was determined to use the first communication channel. Otherwise, the method continues to a transmit over second communication channel step 36. In one embodiment, the first network node determines to use the first communication channel when (and optionally only when) the control data is associated with a future downlink transmission from the second network node to the mobile communication terminal which needs to occur within a limited time period.

In the transmit over first communication channel step 34, the information is transmitted over the first communication channel to the second network node.

In the transmit over second communication channel step 36, the information via a second communication channel when the information is not to be transmitted over the first communication channel. The information can in this case e.g. be the content itself of the uplink transmission, such as user data.

The method can be repeated, to be executed for each uplink transmission received by the first network node.

Figure 4:
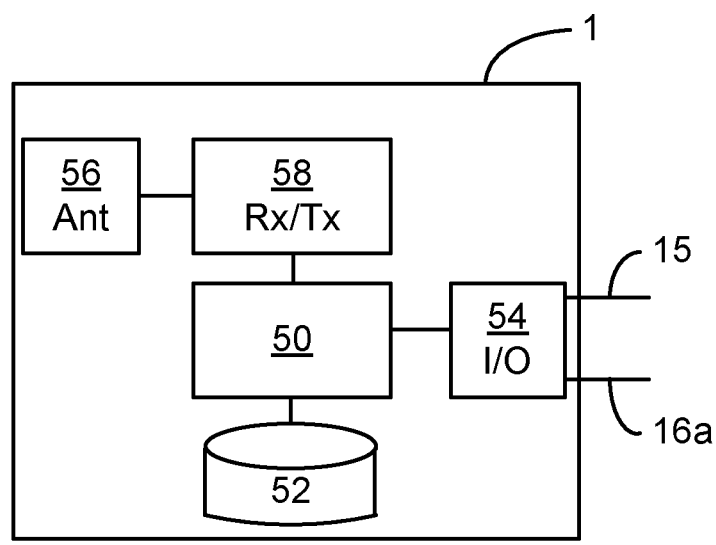
FIG. 4 is a schematic diagram showing some components of a network node such as the network nodes FIGS. 1-2.

FIG. 4 is a schematic diagram showing some components of a network node such as the network nodes 1a-c of FIGS. 1-2. A processor 50 is provided using any combination of one or more of a suitable central processing unit (CPU), multiprocessor, microcontroller, digital signal processor (DSP), application specific integrated circuit etc., capable of executing software instructions stored in a computer program product 52, e.g. in the form of a memory. The processor 50 can be configured to execute the method described with reference to FIG. 3 above.

The computer program product 52 can be a memory being any combination of read and write memory (RAM) and read only memory (ROM). The memory also comprises persistent storage, which, for example, can be any single one or combination of magnetic memory, optical memory, solid state memory or even remotely mounted memory.

The network node 1 further comprises an I/O interface 54 for communicating with the core network and with other network nodes. The I/O interface has one interface allowing communication over the first communication channel 15 and one interface allowing communication over the second communication channel 16a.

The network node 1 also comprises one or more transceivers 58, comprising analogue and digital components, and a suitable number of antennas 56 for radio communication with mobile communication terminals within one or more radio cells. The processor 50 controls the general operation of the network node 1, e.g. by sending control signals to the transceiver 58 and receiving reports from the transceiver 58 of its operation.

Other components of the network node are omitted in order not to obscure the concepts presented herein.

Figure 5:
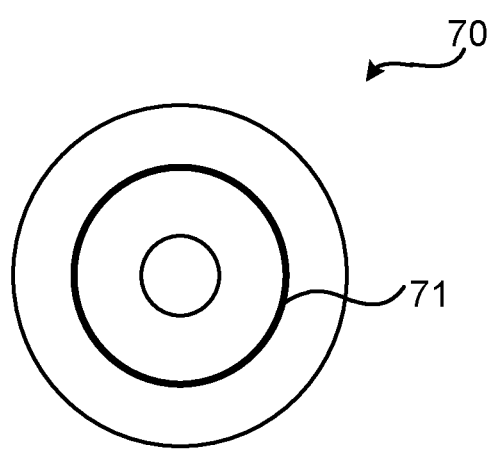
FIG. 5 shows one example of a computer program product 70 comprising computer readable means.

FIG. 5 shows one example of a computer program product 70 comprising computer readable means. On this computer readable means, a computer program 71 can be stored, which computer program can cause a processor to execute a method according to the embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 52 of FIG. 4 or in an external memory such as a USB (Universal Serial Bus) memory. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed, at least in part, by a first network node that is operable to: a) communicate with a second network node using a first communication channel and b) communicate with the second network node using a second communication channel, the method comprising the steps of:

the first network node receiving an uplink transmission from a mobile communication terminal that received a data transmission from the second network node; and as a result of receiving the uplink transmission from the mobile terminal:

the first network node obtaining information bound for the second network node;

the first network node determining whether the obtained information bound for the second network node is time critical information;

the first network node choosing, based on whether the obtained information bound for the second network node is determined to be time critical information, one of: the first communication channel and the second communication channel, wherein the second communication channel is physically separate from the first communication channel, and wherein the first network node is configured to select the first communication channel in the case that the obtained information is determined to be time critical information and to select the second communication channel in the case that the obtained information is not time critical information; and the first network node transmitting the obtained information to the second network node using said chosen communication channel, wherein determining whether the obtained information is time critical information comprises determining whether the obtained information is a downlink channel status report, and the obtained information is determined to be time critical information as a result of determining that the obtained information is a downlink channel status report.

2. The method according to claim 1, wherein, for transmissions from the first network node to the second network node, latency via the first communication channel is lower than latency via the second communication channel.

3. The method according to claim 2, wherein the method further comprises the second network node receiving the information bound for the second network node, and the second network node is configured such that the second network node does not forward to the mobile terminal the information bound for the second network node.

4. The method according to claim 1, wherein the uplink transmission comprises control data, the step of obtaining information bound for the second network node comprises obtaining said control data that was in the uplink transmission, and the step of transmitting the obtained information to the second network node using said chosen communication channel comprises transmitting said control data to the second network node using said chosen communication channel.

5. The method according to claim 1, wherein the second communication channel comprises the use of one or more communication bearers selected from the group consisting of: a microwave link, an optical fibre, and a copper connection.

6. The method according to claim 1, wherein the first communication channel is a wireless communication channel.

7. The method according to claim 6, wherein the wireless communication channel is one of an LTE wireless communication channel and a Global System for Mobile communications (GSM) wireless communication channel.

8. The method according to claim 1, wherein determining whether the obtained information bound for the second network node is time critical information comprises determining whether the obtained information is a negative acknowledgment (NACK), wherein the obtained information is determined to be time critical information as a result of determining that the obtained information is a NACK.

9. The method according to claim 1, wherein the obtained information bound for the second network node comprises information obtained from the uplink transmission from the mobile terminal.

10. A first network node comprising:

a processor; and an instruction memory storing a set of instructions, said set of instructions comprising:

instructions for determining, based on uplink data from a mobile communication terminal, control data bound for a second network node;

instructions for determining whether the obtained control data is time critical control data;

instructions for choosing, based on whether the determined control data that is bound for the second network node is determined to be time critical control data, one of: a first communication channel and a second communication channel, wherein the second communication channel is physically separate from the first communication channel, and wherein the first network node is configured to select the first communication channel in the case that the obtained information is time critical control data and to select the second communication channel in the case that the obtained information is not time critical control data; and instructions for causing the first network node to transmit the determined control data to the second network node, wherein the instructions for causing the first network node to transmit the determined control data to the second network node are configured such that: the first network node transmits the determined control data to the second network node using the first communication channel as a result of the first communication channel being the chosen channel and the first network node transmits the determined control data to the second network node using the second communication channel as a result of the second communication channel being the chosen channel, wherein the instructions for determining whether the control data is time critical information comprise instructions for determining whether the control data is a downlink channel status report, and the instructions for choosing are configured to cause the first node to choose the first communication channel as a result of determining that the control data is a downlink channel status report.

11. The first network node according to claim 10, wherein the first communication channel has a first latency, the second communication channel has a second latency, and the second latency is lower than the first latency.

12. The first network node according to claim 10, wherein the second communication channel comprises one or more of: a microwave link, an optical fibre, and a copper connection.

13. The first network node according to claim 10, wherein the first communication channel is a wireless communication channel.

14. The first network node according to claim 13, wherein the wireless communication channel is one of an LTE wireless communication channel and a Global System for Mobile communications (GSM) wireless communication channel.

15. A method, performed, at least in part, by a first network node that is configured to: a) communicate with a second network node using a first communication channel and b) communicate with the second network using a second communication channel, the method comprising the steps of:

the first network node receiving an uplink transmission from a mobile communication terminal that received a data transmission from the second network node; and as a result of receiving the uplink transmission from the mobile terminal:

the first network node obtaining information bound for the second network node;

the first network node choosing, based on the information bound for the second network node, one of: the first communication channel and the second communication channel, wherein the second communication channel is physically separate from the first communication channel; and the first network node transmitting the obtained information to the second network node using said chosen communication channel, wherein the first network node is configured such that the first network node does not transmit any information directly to the mobile communication terminal.

16. A method, performed, at least in part, by a first network node that is operable to: a) communicate with a second network node using a first communication channel and b) communicate with the second network node using a second communication channel, the method comprising the steps of:

the first network node receiving an uplink transmission from a mobile communication terminal that received a data transmission from the second network node; and as a result of receiving the uplink transmission from the mobile terminal:

the first network node obtaining information bound for the second network node;

the first network node determining whether the obtained information bound for the second network node is time critical information;

the first network node choosing, based on whether the obtained information bound for the second network node is determined to be time critical information, one of: the first communication channel and the second communication channel, wherein the second communication channel is physically separate from the first communication channel, and wherein the first network node is configured to select the first communication channel in the case that the obtained information is determined to be time critical information and to select the second communication channel in the case that the obtained information is not time critical information; and the first network node transmitting the obtained information to the second network node using said chosen communication channel, wherein obtaining information bound for the second network node as a result of receiving the uplink transmission from the mobile terminal comprises the first network node determining that the uplink transmission cannot be successfully decoded by the first network node, and the obtained information bound for the second network node is a message comprising information indicating that the first network node determined that the first network node could not decode the uplink transmission.

\* \* \* \* \*